Patented Aug. 4, 1936

2,049,522

UNITED STATES PATENT OFFICE 2,049,522

FRICTION ELEMENT

Ray E. Spokes and Hobart H. Willard, Ann Arbor, Mich., assignors to American Brakeblok Corporation, New York, N. Y., a corporation of New York No Drawing. Application March 17, 1934, Serial No. 716,173

31 Claims. (Cl. 106—7.5)

This invention relates to friction elements of the kind used in brakes, clutches and similar devices and more particularly to composition friction elements adapted for use in the brakes of automotive vehicles and the like.

Friction elements heretofore used in automotive vehicle brakes have been known to lose their friction properties under the high heat conditions developed by frequent brake applications and this loss is known as "fade-out". It has been proposed to add metal in composition friction elements to overcome fade-out and finely divided lead has been suggested as being desirable. However, serious faults and defects have been encountered in composition friction elements containing metal subject to rapid oxidation under heat, a characteristic of lead. For example, squealing usually develops in brakes equipped with such friction elements; the drums with which the elements are used are found to be scored; and the brakes sooner or later act in a grabby manner causing jerky rather than smooth stopping. Moreover, the life of such composition friction elements is often comparatively short. It is believed that these conditions develop because of oxidation of the metal under the high temperature to which it is subjected during brake operation and the subsequent exposure of the heated metal to oxygen in the air after release of the brakes. The metallic oxides formed by such oxidation are detrimental rather than beneficial in a friction element and it is believed that it is these oxides which score the drum and interfere with smooth brake operation. Moreover, most metallic oxides are accelerators of organic binders of the kind commonly used in composition friction elements and it is believed that the oxides formed in brake operation excessively age the binders and cause disintegration of the elements. Such disintegration releases fillers of the elements which roll between the braking surfaces and set up vibration and cause squealing. The presence of metal in composition friction elements also has the disadvantage of increasing the heat conductivity of the elements and heat generated at the surface during braking often penetrates deeply into the element which tends to char or carbonize organic matter in the element.

The presence of a metal such as lead on the braking surfaces of friction elements reduces the tendency toward fade-out and is otherwise advantageous, and the primary object of our invention is to release metal on the braking surface of a friction element under braking conditions.

Another object is to employ metallic compounds which will decompose and so release metal under braking conditions that oxidation of the metal is prevented whereby defects accruing from the presence of metallic oxides are avoided.

Still another object is to use metallic compounds which will so decompose that an inert or reducing atmosphere, such as carbon dioxide or carbon monoxide gas, is released with the metal to thereby materially reduce the likelihood of oxidation of the metal.

A further object is to distribute the metallic compounds uniformly throughout the friction elements so that decomposition of the compounds and consequent release of metal may be progressively effected as the elements wear away in service.

We have found that organic metallic compounds which do not develop oxides upon decomposition may be used advantageously in a friction element and a further object of our invention is to incorporate one or more of such compounds in an element and when more than one compound is incorporated to use compounds which will decompose at different temperatures so that greater quantities of metal and different metals will be released successively as the friction temperature rises.

A still further object is to subject the metallic compounds in the friction element to a catalytic action so that the decomposition of the compounds may be controlled to occur when and as required.

A friction element of the kind to which our invention appertains is usually mounted on a member in a brake couple to be movable to and from friction engagement with the surface of a rotative drum or the like suitably connected, for example, to the wheel of an automotive vehicle and the frictional engagement of the element with the drum retards rotation of the drum. The heat generated in frequent applications of the element to the drum often builds up a high temperature at the braking surface of the element and this temperature is sufficient to effect decomposition of most organic metallic compounds which release metal upon decomposition. Hence, by incorporating organic metallic compounds in a friction element metal may be released on the braking surface of the element when the braking surface is subjected to a high temperature and since this may be effected during the frictional engagement of the element the metal will be released during braking action.

We prefer to incorporate organic metallic compounds which do not develop oxides upon decomposition in the friction elements for such compounds not only release metal upon decomposition but also release reducing or inert substances such as hydrogen, carbon monoxide, carbon dioxide or the like, and reducing and inert substances released in the gaseous state overlie the braking surface of the element when the element is disengaged from the drum and these substances tend to prevent oxidation of metal released on the braking surface.

A metal such as lead is known to have a beneficial effect upon the braking action of a friction element but when a free metal is incorporated in a friction element it has been observed that the metal instead of merely filming over the braking surface and protecting the element often oxidizes because the metal is heated to a high temperature in brake operation and is exposed to oxygen in the surrounding air when the brake is released. However, when an organic metallic compound which does not develop oxides upon decomposition is incorporated in a friction element it will decompose under friction heat and will release metal during brake operation which will film over the braking surface of the friction element. Moreover, when such an organic compound decomposes the products of decomposition, in addition to the metal, are found to be either inert or strong reducing agents such as, for example, hydrogen, carbon monoxide or carbon dioxide. Of course, metal so released is heated in brake operation and this heated metal is exposed to oxygen in the air when the brake is released and part of this metal may oxidize. The friction element is forcibly pressed against the drum to effect braking and therefore the substances released on the braking surface of the element upon decomposition of the metallic compound are not only subjected to friction heat but are also subjected to pressure. In each successive operation of the brake a further decomposition of a part of the organic compound is effected, so long as the high temperature remains, and additional metal as well as inert substances or reducing agents are released and these agents tend to convert any oxide present into free metal. The decomposition of the organic compound is retarded and thereby controlled by the pressure during brake application.

The rate of decomposition of organic metallic compounds which do not develop oxides upon decomposition is dependent upon the temperature to which the compounds are subjected and the rate of decomposition increases as the temperature rises. In view of this as the temperature at the braking surface of the friction element increases greater quantities of metal are released and since the need for metal on the braking surface of the element increases as the temperature rises it follows that metal is supplied according to the need therefor in brake operation.

The organic metallic compounds which do not develop oxides upon decomposition may be distributed uniformly throughout the friction element for a substance used in the element may be impregnated with the compound. For example, in a composition friction element containing asbestos the compound may be precipitated upon the fibers of the asbestos, and likewise, upon selected of the materials used in a woven or felted friction element, and in either case the compound is uniformly distributed in the friction element so that as the element wears away in service the decomposition of the compound may be successively effected which insures a supply of metal on the friction surface of the element throughout the life thereof.

We prefer to use organic metallic compounds which not only do not develop oxides upon decomposition but also to use those compounds which do not carbonize for the reason that carbon might change the frictional characteristics of the element, but this does not mean that those compounds which carbonize as well as produce metal upon decomposition may not be used for satisfactory operation may be attained whether or not carbon is released with the metal.

Lead is known to have a beneficial effect on the braking action of a friction element and an illustrative embodiment of our invention is to incorporate in a friction element an organic lead compound which does not produce oxides upon decomposition so that when the compound decomposes free lead will be released on the friction surface of the element. Lead formate is an example of such a compound for this compound readily decomposes at a temperature of about 400° F., a temperature frequently encountered in brake operation. Lead is released upon decomposition of this compound as well as hydrogen, carbon monoxide, carbon dioxide, and formaldehyde and therefore this compound is a good example of an organic metallic compound which does not produce oxides upon decomposition but which does release a metal and inert or reducing substances.

While our invention may be used in composition friction elements having a wide variety of ingredients we have found that a satisfactory friction element can be made from the following composition.

| | Parts by weight |
|---|---|
| Asbestos | 65 |
| Bituminous coal | 25 |
| Purely polymerized vegetable drying oil | 8 |
| Phenol resin | 8 |
| Sulphur | 3 |
| Solvent | 6 |
| Lead formate | total weight of mix 12% |

The quality of asbestos used may be varied within limits, dependent upon the physical properties desired in the friction element, and the asbestos may be of the short fibre kind but we have found that by using some long fibre asbestos the strength of the friction element may be improved and in the foregoing composition about 80% of the asbestos used may be short fibre asbestos and the remaining 20% medium long spinning fibre asbestos for such proportions produce satisfactory results.

The bituminous coal is but one form of bituminous material that may be used but we have found it advantageous to use bituminous coal for it produces satisfactory results and has a beneficial effect in brake operation. The quantity used may be varied within limits, like the asbestos, dependent upon the physical properties desired in the friction element.

The purely polymerized vegetable drying oil and the phenol resin bond the friction materials, that is, the asbestos and coal, in the present instance, to provide a hard friction element which will stand up in service and while we have specified a bond of purely polymerized vegetable drying oil and a phenol resin it is to be understood that any bond suitable for the purpose might be used within the purview of our invention.

The sulphur serves as a plasticizing agent and facilitates uniform spreading of the ingredients to insure the production of a homogeneous friction element and the sulphur has other beneficial effects in the friction element.

The particular quantities of bond and sulphur may be varied within limits, like the asbestos and bituminous coal, dependent upon the physical properties desired in the friction element.

The solvent expedites mixing of the materials and we prefer to use a solvent such as a glycol ether of which oleum spirits and the ethyl ether of ethylene glycol are examples. We have found it advantageous to use a solvent having an initial distillation point of about 240° F. and a dry end point of about 310° F. for a solvent with these characteristics may be eliminated easily in the cure of the element which is effected by heat. The quantity of solvent used may be varied but a sufficient quantity should be used to accomplish uniform spreading of the materials but the quantity should be kept as low as possible so that the solvent will be eliminated in the cure without any detrimental effect on the other ingredients or on the friction element.

The lead formate of the composition is an example of a compound which does not produce oxides upon decomposition but which does free a metal which will have a beneficial effect in brake operation. Lead formate is but one example of such a metallic compound. We have found that about 12% of the weight of the mix is a desirable quantity of lead formate to use although, of course, the quantity may be varied dependent upon the requirements.

The formates of other metals may be used and we have found that the formates of bismuth, copper, antimony, tin or cadmium have a beneficial effect in a friction element and the selection of the desired formate or other compound depends upon the conditions of use to which the friction element is to be subjected for these metals have distinct characteristics when released upon the braking surface of a friction element and some of these characteristics may be desirable in one instance and not in another. Hence, the selection of the formate or other compound to be used depends upon the characteristic desired of the metal to be released on the friction surface of the friction element.

An example of the decomposition of lead formate which may be effected in brake operation is as follows:

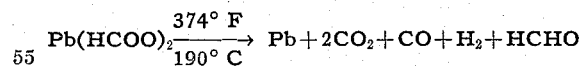

$$Pb(HCOO)_2 \xrightarrow[190°\ C]{374°\ F} Pb + 2CO_2 + CO + H_2 + HCHO$$

A temperature of 374° F. is frequently encountered in brake operation. It will be noted that the decomposition effected as above results in free metallic lead, carbon dioxide, carbon monoxide, hydrogen and formaldehyde, the latter four substances being gases which are evolved in substantially the following proportions:

| | Per cent |
|---|---|
| Carbon dioxide | 88.0 |
| Carbon monoxide | 2.0 |
| Hydrogen | 7.5 |
| Formaldehyde | 0.6 |

The decomposition of the metallic compounds which do not develop oxides upon decomposition may be accelerated or otherwise controlled by the use of a catalyst and we have found the use of a catalyst to be advantageous. The chief function of the catalyst is to lower the decomposition temperature to a point which corresponds to the temperature developed in a friction element when used under the usual conditions in brake operation. Various types of catalysts have been found to be successful and by way of example alkaline catalysts are active whereas acid substances do not act as catalysts. Almost all of the potassium compounds show catalytic activity except those which are predominately acidic in character. Oxidizing agents which are weak and also alkaline in nature are also satisfactory as catalysts but strongly acid oxidizing agents are not successful. It is desirable that but a small percentage of catalyst be used and we have found that satisfactory results can be obtained by using a catalyst in an amount not exceeding ten percent of the weight of the metallic compound which does not develop oxides upon decomposition although certain catalytic agents such as potassium dichromate when used with lead formate has been found to be effective as a catalyst in a quantity as low as about 0.25% by weight of the lead formate.

Examples of compounds which have been found to be satisfactory catalytic agents when used with metallic compounds which do not develop oxides upon decomposition are: potassium hydroxide (KOH); potassium hydroxide + copper oxide (CuO); potassium hydroxide + zinc oxide (ZnO); thallium oxide ($Tl_2O_3$); thallic formate ($Tl(HCOO)_3$); thallous formate ($Tl(HCOO)$); sodium bismuthate ($NaBiO_3$); potassium permanganate ($KMnO_4$); potassium dichromate ($K_2Cr_2O_7$); potassium chromate ($K_2CrO_4$); potassium chloride (KCl); ammonium chloride ($NH_4Cl$); borax ($Na_2B_4O_7$); potassium pyroarsenite ($K_4As_2O_5$); potassium pyroarsenate ($K_4As_2O_7$);

potassium acid arsenate ($KH_2AsO_4$); tellurium oxide ($TeO_2$).

The uses to which friction elements are put vary and consequently the conditions under which the elements operate vary and we have found that one metal may be advantageous under some conditions of use while others may be more satisfactory under other conditions of use. Moreover, one metal may be satisfactory in a particular temperature range while another metal may be more satisfactory in a different temperature range, and therefore to meet this condition compounds which will release metal at different temperatures may be advantageously used in one element. When this is done, one compound will decompose and release metal at a predetermined temperature while another compound will decompose and release metal at a higher temperature and not only will additional metal be released at the higher temperature but a different metal will also be released and the combined functioning of these metals will have a beneficial effect. It will therefore be apparent that a plurality of compounds may be advantageously employed in a single friction element.

Our invention enables us to free a metal on the friction surface of a friction element to eliminate fade-out, grabby brake action, detrimental aging of the bond and other deleterious and undesirable conditions in a brake. Furthermore, by using a catalyst with a metallic compound which does not develop oxides upon decomposition we are enabled to control the decomposition and effect it as desired or required in the use of the friction element. Furthermore, since such compounds develop inert or reducing atmospheres we are enabled to eliminate the formation of metallic oxides which are believed to have a detrimental effect on brake operation and even if oxides are formed these are quickly eliminated in the operation of the brake for when a friction element containing a compound or compounds of the kind described is subjected to pressure in the presence of the decomposing temperature the oxides are eliminated.

We have described the preferred forms of our invention but it is to be undestood that these are capable or variation and modification and we therefore do not wish to be limited to the precise details set forth but desire to avail ourselves of such changes and alterations as fall within the purview of the following claims:

We claim:

1. A friction element having a metallic formate therein which will decompose when subjected to friction heat in the use of the element to free metal on the friction surface of the element.

2. A friction element having a metallic formate therein which will decompose when subjected to friction heat in the use of the element to free metal on the friction surface of the element and produce a reducing atmosphere to eliminate oxides on the friction surface when subjected to pressure in the use of the element.

3. A friction element having a metallic formate therein which will decompose when subjected to friction heat in the use of the element to free metal on the friction surface of the element and produce an inert atmosphere to prevent oxidation of the freed metal.

4. A friction element having a metallic formate therein which will decompose when subjected to friction heat in the use of the element to free metal on the friction surface of the element, and a catalyst for controlling the decomposition of the metallic formate.

5. A friction element having metallic formate therein which will decompose when subjected to friction heat in the use of the element to free metal on the friction surface of the element and produce a reducing atmosphere to eliminate oxides on the friction surface when subjected to pressure in the use of the element, and a catalyst for controlling the decomposition of said metallic formate.

6. A friction element having metallic formate therein which will decompose when subjected to friction heat in the use of the element to free metal on the friction surface of the element and produce an inert atmosphere to prevent oxidation of the freed metal, and a catalyst for controlling the decomposition of said metallic formate.

7. A friction element having a plurality of metallic formates therein having different decomposition temperatures whereby the formates will decompose successively when subjected to friction heat in the use of the element to successively free metal on the friction surface of the element.

8. A friction element having a plurality of metallic formates therein having different decomposition temperatures whereby the formates will decompose successively when subjected to friction heat in the use of the element to successively free metal on the friction surface of the element, and catalytic material in said element to control decomposition of said metallic formates.

9. A friction element having a plurality of metallic formates therein having different decomposition temperatures whereby the formates will decompose successively when subjected to friction heat in the use of the element to successively free metal on the friction surface of the element and produce an inert atmosphere to prevent oxidation of the freed metal.

10. A friction element having a plurality of metallic formates therein having different decomposition temperatures whereby the formates will decompose successively when subjected to friction heat in the use of the element to successively free metal on the friction surface of the element and produce an inert atmosphere to prevent oxidation of the freed metal, and catalytic material in said element to control decomposition of said metallic formates.

11. A friction element having a plurality of metallic formates therein having different decomposition temperatures whereby the formation will decompose successively when subjected to friction heat in the use of the element to successively free metal on the friction surface of the element and produce a reducing atmosphere to eliminate oxides on the friction surface when subjected to pressure in the use of the element.

12. A friction element having a plurality of metallic formates therein having different decomposition temperatures whereby the formates will decompose successively when subjected to friction heat in the use of the element to successively free metal on the friction surface of the element and produce a reducing atmosphere to eliminate oxides on the friction surface when subjected to pressure in the use of the element, and a catalytic material in said element to control the decomposition of said metallic formates.

13. A friction element containing friction materials, a bond, and a metallic formate which will decompose when subjected to friction heat in the use of the element to free metal on the friction surface of the element.

14. A friction element containing friction materials, a bond, and a metallic formate which will decompose when subjected to friction heat in the use of the element to free metal on the friction surface of the element and produce an inert atmosphere to prevent oxidation of the freed metal.

15. A friction element containing friction materials, a bond, and a metallic formate which will decompose when subjected to friction heat in the use of the element to free metal on the friction surface of the element and produce a reducing atmosphere to eliminate oxides on the friction surface when subjected to pressure in the use of the element.

16. A friction element containing friction materials, a bond, a metallic formate which will decompose when subjected to friction heat in the use of the element to free metal on the friction surface of the element and produce a reducing atmosphere to eliminate oxides on the friction surface when subjected to pressure in the use of the element, and a catalyst for controlling the decomposition of said metallic formate.

17. A friction element containing friction materials, a bond, a metallic formate which will decompose when subjected to friction heat in the use of the element to free metal on the friction surface of the element and produce an inert atmosphere to prevent oxidation of the freed metal, and a catalyst for controlling the decomposition of said metallic formate.

18. A friction element containing substantially 65 parts by weight of asbestos, substantially 25 parts by weight of bituminous coal, substantially 8 parts by weight of purely polymerized vegetable drying oil, substantially 8 parts by weight of phenol resin, substantially 3 parts by weight of sulphur, and a metallic formate in an amount equal to substantially 12% of the total weight of the asbestos, bituminous coal, purely polymerized vegetable drying oil, phenol resin and sulphur.

19. A friction element containing substantially 65 parts by weight of asbestos, substantially 25 parts by weight of bituminous coal, substantially 8 parts by weight of purely polymerized vegetable drying oil, substantially 8 parts by weight of phenol resin, substantially 3 parts by weight of sulphur, and lead formate in an amount equal to substantially 12% of the total weight of the asbestos, bituminous coal, purely polymerized vegetable drying oil, phenol resin and sulphur.

20. A friction element having lead formate therein adapted to decompose when subjected to friction heat in the use of the element to free lead on the friction surface of the element.

21. A friction element having lead formate therein adapted to decompose when subjected to friction heat in the use of the element to free lead on the friction surface of the element and produce a reducing atmosphere to eliminate lead oxides on the friction surface when subjected to pressure in the use of the element.

22. A friction element having lead formate therein adapted to decompose when subjected to friction heat in the use of the element to free lead on the friction surface of the element and produce an inert atmosphere to prevent the formation of lead oxides.

23. A friction element having copper formate therein adapted to decompose when subjected to friction heat in the use of the element to free copper on the friction surface of the element.

24. A friction element having copper formate therein adapted to decompose when subjected to friction heat in the use of the element to free copper on the friction surface of the element and produce a reducing atmosphere to eliminate copper oxides on the friction surface when subjected to pressure in the use of the element.

25. A friction element having copper formate therein adapted to decompose when subjected to friction heat in the use of the element to free copper on the friction surface of the element and produce an inert atmosphere to prevent the formation of copper oxides.

26. A friction element having bismuth formate therein adapted to decompose when subjected to friction heat in the use of the element to free bismuth on the friction surface of the element.

27. A friction element having bismuth formate therein adapted to decompose when subjected to friction heat in the use of the element to free bismuth on the friction surface of the element and produce a reducing atmosphere to eliminate bismuth oxides on the friction surface when subjected to pressure in the use of the element.

28. A friction element having bismuth formate therein adapted to decompose when subjected to friction heat in the use of the element to free bismuth on the friction surface of the element and produce an inert atmosphere to prevent the formation of bismuth oxides.

29. The method in the art of braking which consists in uniformly distributing a metallic formate in a friction element, and providing a metallic film on the friction surface of the element throughout the use of the element by decomposing the formate at the friction surface of the element by friction heat generated in the use of the element.

30. The method in the art of braking which consists in uniformly distributing a metallic formate in a friction element, providing a metallic film on the friction surface of the element throughout the use of the element by decomposing the formate at the friction surface of the element by friction heat generated in the use of the element, and releasing a reducing atmosphere upon decomposition of the formate to eliminate oxides from the metallic film.

31. The method in the art of braking which consists in uniformly distributing a metallic formate in a friction element, providing a metallic film on the friction surface of the element throughout the use of the element by decomposing the formate at the friction surface of the element by friction heat generated in the use of the element, and releasing an inert atmosphere upon decomposition of the formate to prevent oxidation of the metallic film.

RAY E. SPOKES.
HOBART H. WILLARD.